United States Patent [19]

Klinner

[11] Patent Number: 4,581,880
[45] Date of Patent: Apr. 15, 1986

[54] CROP ENGAGING APPARATUS AND METHODS

[75] Inventor: Wilfred E. Klinner, Milton Keynes, England

[73] Assignee: National Research Development Corporation, London, England

[21] Appl. No.: 593,917

[22] Filed: Mar. 27, 1984

Related U.S. Application Data

[63] Continuation-in-part of Ser. No. 378,392, May 14, 1982, abandoned, and a continuation-in-part of Ser. No. 477,872, Mar. 23, 1983, Pat. No. 4,545,188.

[30] Foreign Application Priority Data

May 13, 1982 [GB] United Kingdom ............ 8214000
Mar. 11, 1983 [GB] United Kingdom ............ 8306762

[51] Int. Cl.[4] ............................................ A01D 89/00
[52] U.S. Cl. .................................. 56/364; 56/DIG. 1
[58] Field of Search ............... 56/DIG. 1, 127, 364, 56/400; 130/27 N, 27 P, 27 G

[56] References Cited

U.S. PATENT DOCUMENTS

| | | | |
|---|---|---|---|
| 985 | 10/1838 | Grieb ........................... | 130/27 G |
| 297,446 | 4/1884 | Prahl . | |
| 369,335 | 9/1887 | Goddu . | |
| 1,257,592 | 2/1918 | Ek ................................ | 130/27 P |
| 2,217,309 | 4/1939 | Padrick . | |
| 2,286,095 | 6/1942 | Innis ............................. | 56/364 |
| 2,347,664 | 5/1944 | Chilton ........................ | 130/27 P |
| 2,534,681 | 12/1950 | Randall ...................... | 56/400.21 |
| 2,704,150 | 3/1955 | Scranton .................... | 56/400 |
| 2,974,467 | 3/1961 | Long ........................... | 56/364 |
| 3,125,845 | 3/1964 | Lee .............................. | 56/364 |
| 3,126,693 | 3/1964 | Renn ........................... | 56/364 |
| 3,126,696 | 3/1964 | Ratti . | |
| 3,295,302 | 1/1967 | Lee .............................. | 56/400 |
| 3,531,927 | 10/1970 | Wood .......................... | 56/400 |
| 3,693,335 | 9/1972 | Mathews ..................... | 56/12.7 |
| 3,713,283 | 1/1973 | Fritz ............................ | 56/364 |
| 3,927,679 | 12/1975 | Ausherman ................. | 130/27 HA |
| 3,927,985 | 12/1975 | Hyttinge et al. . | |
| 3,983,883 | 10/1976 | Ashton et al. ............... | 130/27 P |
| 4,021,995 | 5/1977 | Hill .............................. | 56/400 |
| 4,035,992 | 7/1970 | Moosbrucker et al. ..... | 56/DIG. 1 |
| 4,182,102 | 1/1980 | Anderderson et al. ..... | 56/364 |
| 4,202,159 | 5/1980 | Young ......................... | 56/364 |
| 4,255,923 | 3/1981 | Spaida . | |
| 4,312,366 | 1/1982 | De Busscher ............... | 130/27 P |

FOREIGN PATENT DOCUMENTS

| | | | |
|---|---|---|---|
| 10705 | 9/1880 | Fed. Rep. of Germany ... | 130/27 N |
| PCT/GB79/-00053 | 11/1979 | PCT Int'l Appl. . | |

OTHER PUBLICATIONS

Article, Fan Ted Airflow Action Tedder.
Aspirofane.
Murphy Pick-Up.

Primary Examiner—Paul J. Hirsch
Attorney, Agent, or Firm—Cushman, Darby & Cushman

[57] ABSTRACT

Apparatus for picking up and conveying crop comprises a horizontal rotor driven from the top of a tractor in a sense such as to pick up crop and carry the crop upwardly and rearwardly over the rotor. The rotor comprises a main support structure and outwardly extending crop engaging elements formed of stiff resilient non-metallic material and arranged to be yieldable along the general direction of crop flow. The yielding can be due to the material of the elements or a separate biasing element, or both. Each crop engaging element is an outwardly extending fin-like element having a principal plane perpendicular to the direction of crop flow, having an outward length greater than its width transverse to the crop flow, and having side edges which converge towards each other in the outward direction. Preferably the shape includes or consists of a triangle the apex of which is truncated.

26 Claims, 37 Drawing Figures

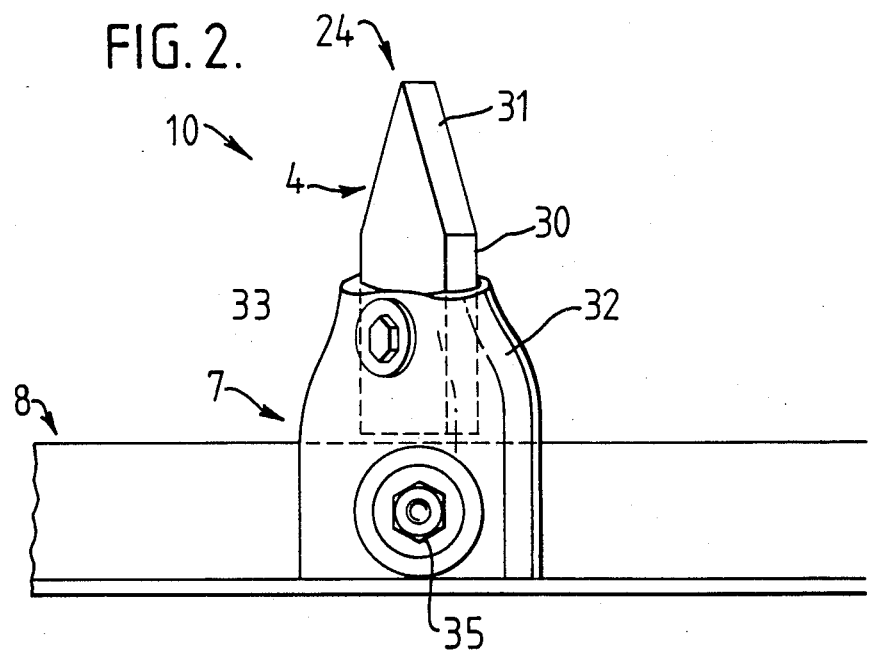
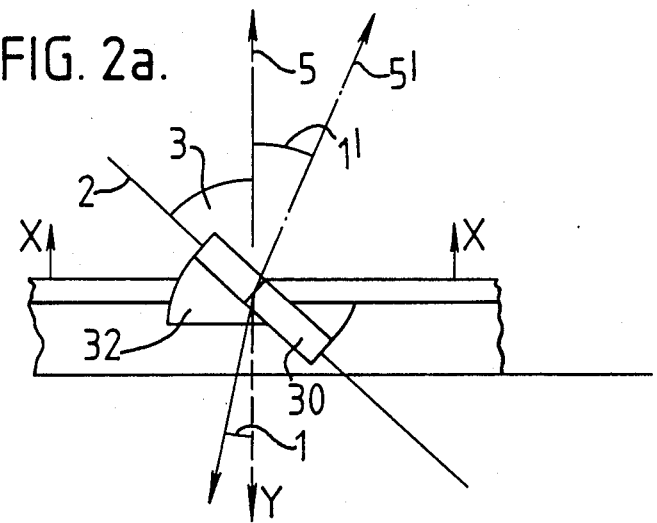

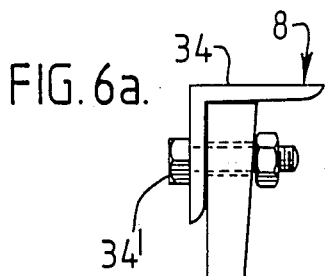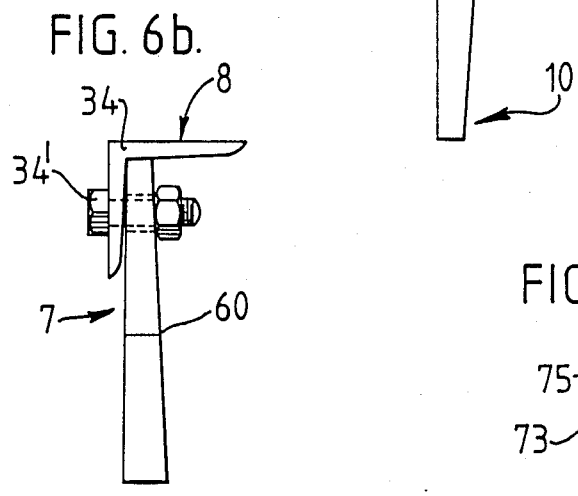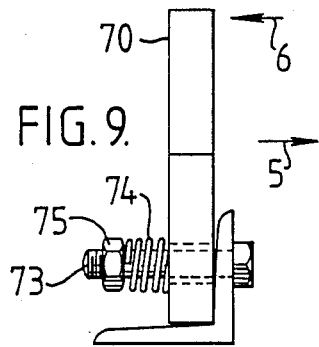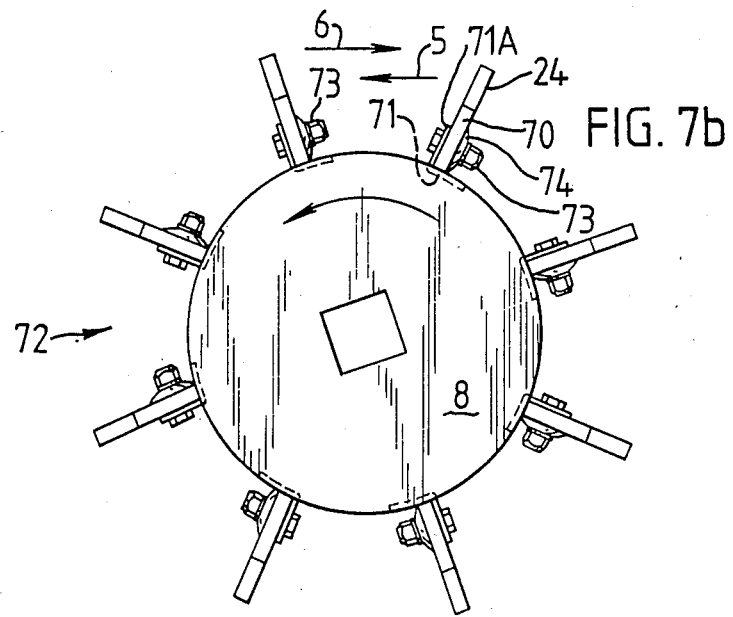

CROP ENGAGING APPARATUS AND METHODS

The present application is a continuation in part of U.S. patent application Ser. Nos. 378,392, filed May 14, 1982, now abandoned and 477,872 filed Mar. 23, 1983 now U.S. Pat. No. 4,545,188.

The present invention relates to crop engaging devices, apparatus and methods. The invention is concerned in one aspect with apparatus for conditioning of crops especially, but not exclusively, grasses, and is concerned in other applications with pick-up and conveying rotors for collecting cut crop and conevying the same.

Considering firstly the aspect of the present invention concerned with conditioning of crops, it is well known to treat forage crops such as grasses and legumes in order to assist loss of moisture in the field after cutting prior to storage to provide animal fodder. The speed at which surface and sap moisture evaporate from the cut crop during field exposure depends inter alia on the physical condition of the crop. The principle barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, spiking, bending or scuffing the stems and leaves of the crop, is known as "condition". In our published pending UK patent application No. 8012426, Publication No. 2041713, there are set out the advantages of conditioning by methods which cause predominantly surface damage to the crop, and the present invention in some aspects is concerned with improvements in such conditioning by surface damage, and optionally more deep seated damage applied to the crop as longitudinal scratches or lesions, or as localised spike pricks.

In the aforesaid prior patent application there is disclosed a form of crop conditioning device comprising a brush-like structure having a multiplicity of stiff, resilient, elongate conditioning elements for conditioning crop by relative movement between the conditioning elements and the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Typically such a conditioning rotor consists of a brush of synthetic plastics brush elements, also referred to as filaments, conveniently arranged in tufts having a degree of randomness of elements within each tuft, although in some aspects there are described conditioning devices in which the conditioning elements are arranged regularly.

In one aspect, the present invention is concerned with more effective and optionally more severe forms of conditioning devices, and with new combinations of conditioning devices, and other crop engaging devices.

Considering now a second aspect of the invention concerned with pick-up rotors for collecting cut crop, and conveying rotors for crop in general, there have been known previously a number of froms of crop conveying rotors having outwardly directed crop conveying elements. One form of such crop conveying elements has been provided by rotors generally in the form of paddle wheels with flat rib-like conveying elements extending transversely across the width of the conveying rotor. Such paddles were sometimes straight edged, and sometimes shaped with serrations or other patterns. Examples of previous disclosures of such rotors are to be found in U.S. Pat. No. 3,676,988 (Bucher-guyer) which shows in FIG. 9 a horizontal conditioning rotor provided with beater bars 4b formed with saw-teeth shaping. Another prior patent, UK Pat. No. 1140284 (Landbruksteknisk) shows in FIG. 2 at 15 a feed roller the free edges of which are said to be preferably waved or saw-toothed. Also in UK Pat. No. 1214840 (Vissers) there is disclosed a paddle wheel type of conveying rotor which it is said may be made of sheet metal or of synethetic plastics material, rubber or like flexible elastic material.

As has been mentioned, our own previously published UK pending patent application No. 8012426 shows pick-up and conveying rotors including outwardly directed crop engaging elements, which may be formed of synthetic plastics material.

In our prior granted UK Pat. No. 1322165, before amendment, there is disclosed in FIGS. 1 and 3 a crop conditioning device in which a rotor has a number of outwardly directed conditioning elements formed of lengths of rubber regularly disposed about the axis of the rotor.

In a second main aspect, the present invention seeks to provide improved forms of crop engaging elements differing from known elements by shape, configuration, or physical properties, or various combinations of these factors.

According to the present invention in a first aspect there is provided apparatus for picking up and conveying crop comprising a moveable frame for movement over the ground, a rotor mounted for rotation relative to the frame, and drive means for driving the rotor in rotation to pick up and convey crop, said rotor including support means and a plurality of outwardly extending crop engaging elements mounted on the support means for picking up and conveying crop, each crop engaging element being arranged to be resiliently yieldable, and the yielding arrangement having sufficient stiffness for the elements to be capable of returning after yielding to their undeflected dispositions at least predominantly by virtue of the resilience of the yielding arrangement, each crop engaging element comprising an outwardly extending fin-like element having a principal plane which traverses the general direction of crop flow, and having a length in the outward direction greater than its width transverse to the direction of crop flow, each outwardly extending, fin-like element having side edges which, at the crop engaging region of the element, converge towards each other in the outward direction.

In accordance with the invention in another aspect, there is provided apparatus for picking up and conveying crop comprising a moveable frame for movement over the ground, a rotor mounted for rotation relative to the frame, and drive means for driving the rotor in rotation to pick up and convey crop, said rotor including support means and a plurality of outwardly extending crop engaging elements mounted on the support means for picking up and conveying crop, each crop engaging element being resilient or resiliently mounted, and each crop engaging element comprising an outwardly extending fin-like element having a principal plane which traverses the general direction of crop flow, each outwardly extending, fin-like element having side edges which diverge symetrically or asymetrically in the crop engaging region from the tip towards the base, to facilitate intrusion into the crop layer and subsequent detachment of the crop under centrifugal effect, whilst at the same time preventing material from reaching and wrapping in the core region.

In preferred arrangements, each crop engaging element is formed of stiff resilient material and is arranged to be yieldable preferentially in a selected preferred direction relative to the general direction of crop flow, the said preferred direction of yielding including at least a component along the direction of principal load on the element due to the crop flow.

In some preferred arrangements, each crop engaging element is yieldable at least predominantly by yielding movement at a region spaced from the distal, crop-engaging, region of the element.

The yielding of the crop engaging elements may be due to the resilient nature of the material from which the elements are formed, or may be due to an additional yielding arrangement by pivoting, springing or otherwise, or may be due to a combination of such yielding effects.

The said yielding elements may be returned after yielding to their undeflected dispositions by a combination of the yielding arrangement together with centrifugal force.

The invention finds particular application where the crop engaging elements are formed of thick stiff resilient and generally flat material (for example thick stiff resilient sheet-like material), conveniently of synthetic plastics material. The elements may be formed of elastomeric material, for example natural or synthetic rubber. In one example each element may be formed from 9 mm thick polypropylene. The elements may have generally planar surfaces but there may be provided grooves or strengthening ribs in or on the surfaces.

In general the invention finds application in four main forms, as follows:

(i) a crop engaging device in which the yielding movement of the crop engaging element is provided by a separate mounting means mounting the crop engaging element onto a support on a rotor, such a form being provided for example by a flexible sleeve in which an outwardly directed fin is mounted;

(ii) a crop engaging device in which each crop engaging element comprises an outwardly extending fin in which the plane of the fin is twisted over part of the extent of the fin, the twist of the fin providing a region capable of the required yielding movement;

(iii) a crop engaging device in which each crop engaging element is a flat outwardly directed element generally transverse to the direction of crop flow, and in which the thickness of the flat element is reduced at or near the region where the element is secured to a support such as a rotor or stationary support; and (iv) a crop engaging device in which each crop engaging element is secured to a support by means allowing a pivoting or rocking motion of the element against a spring securing means.

In one aspect the invention may be considered as embracing outwardly directed crop engaging elements ranging from a series of relatively stiff outwardly extending fins having a greater outwardly extending length than width transverse to the direction of crop flow, in which provision may be arranged for separate yielding means such as pivoting and spring like arrangements to allow a relatively stiff element to pivot, to more resilient outwardly directed fins, where less provision need be made for springing and pivoting arrangements, and more yielding effect may be provided by the inherent resilience of the elements themselves.

There will now be set out a number of specific features in accordance with this aspect of the invention which may be preferred or convenient in putting the invention into use.

The said principal plane of each engaging element of the device preferably traverses the general direction of crop flow at an angle in the range 30° to 90°. In some arrangements the said angle may be about 45°, and in others the said angle may be about 90°.

The said preferred direction of yielding of each crop engaging element of the device may be inclined to the direction of principal load on the element due to crop flow at an angle in the range of 0° to 45°, and it is preferred that in many arrangements, that the preferred direction of yielding lies generally along the direction of principal load on the element due to crop flow.

In one form, each crop engaging element of the device may be mounted in and secured to a flexible sleeve, the sleeve being fixedly secured to the said support means of the device and being arranged to allow yielding of the element by flexing of the sleeve.

Conveniently, the crop engaging element may be a generally flat element, and the element may be secured to the sleeve by a first coupling member, such as a bolt, which passes through the sleeve and deforms the sleeve by compressing the walls of the sleeve against the element, the sleeve being secured to the said support means of the device by a second coupling member, such as a further bolt, which passes through the sleeve and deforms the sleeve by compressing the walls of the sleeve against the support means, the said preferential yielding of the crop engaging element being achieved by virtue of the deformation of the sleeve by at least one of the coupling members, usually by a combination of the deformation produced by both coupling members.

In accordance with a further feature, the sleeve may be flattened in a first plane in the region of the said support means of the device by virtue of the securement of the sleeve to the support means, and may be flattened in a second plane in the region of the element by virtue of the securement of the sleeve to the element, the said first plane being inclined relative to the second plane in a disposition equivalent to rotation about an axis generally along the length of the sleeve.

Turning to an alternative general form of the yielding arrangement, each crop engaging element may be secured to the support means of the device by a coupling member, such as a bolt, which allows movement between the element and the support means, for example by the bolt being a loose fit in a hole through the element, there being provided resilient biasing means, such as a spring or flexible bush or washer, which biasses the element towards an outwardly extending operating position, the arrangement allowing yielding of the element by rocking or pivotting movement of the element relative to the support means against the action of the biassing means.

Conveniently, where the element is a generally flat element, the element may be secured to a cooperating flat surface of the support means by the said coupling member, which is arranged to pass through the element, the said resilient biassing means acting to bias the element towards the flat surface and the element being yieldable by a rocking motion away from the flat surface against the effect of the biassing means.

In yet another form of the yielding arrangement, the said preferential yielding of each crop engaging element may be provided by virtue of variation in shape and/or thickness of the element. For example, where each element is a fin-like element having a length in the outward direction from the support means greater than its width transverse to the direction of crop flow, the plane of the fin-like element may be twisted over part of the extent of the element, the twist of the element providing a region capable of a yielding movement which differs directionally from that inherent in the base and tip regions of the element. In another example, each crop engaging element may be a generally flat element having a reduced thickness at or near the region where the element is secured to the support means, the region of reduced thickness providing a required yielding movement.

Where a crop engaging device according to the invention takes the form of a conditioning device, one advantage is that more effective conditioning can be provided by the selective yielding of the elements in a predetermined direction. The conditioning effected can be more severe than has previously been thought to be acceptable, but such severe conditioning is now thought to be acceptable firstly because of good crop alignment which can be achieved with devices according to the invention, which tends to provide longitudinal lesions in the crop rather than fragmentation, and secondly it is thought that fragmentation is more acceptable due to more efficient crop pick-up by pick-up rotors embodying the present invention.

Another considerable advantage of the present invention lies in the balance between providing adequate protection for the crop engaging elements by allowing yielding in the face of objects more solid than the crop, whilst at the same time retaining the crop engaging elements in the outwardly extended operational position without the need to rely upon centrifugal force. Crop engaging rotors which rely upon centrifugal force to maintain the crop engaging elements in the operative position tend to require fast speeds and, consequently, high power consumption from drive devices. Moreover, the risks of propelling extraneous objects and causing injury and damage are greater.

Another advantage which arises with devices embodying the inventive concepts of the present specification is that there may be provided crop engaging elements of a flat or planar nature in which the principal plane of each element is inclined to the general direction of crop flow.

In some preferred arrangements each element extends outwardly substantially radially of a rotor, although in other arrangements the element may be inclined to a radius of the rotor.

The outer end of each element may be terminated in a surface generally perpendicular to the longitudinal axis of the fin, or in a surface inclined to the longitudinal axis of the fin, or may be terminated in an arrow shaped point.

In one aspect of the invention, the shape of the outer end of a crop engaging element provides an independent inventive feature which finds application whether or not applied in combination with other features of the invention.

The shape of the elements according to the invention gives ready intrusion into the crop layer, whilst preventing crop reaching and wrapping in the rotor core region, and the side edges converging towards the element tips assist rapid and clean detachment of the crop by centrifugal effect. Where the shape includes or consists of a truncated triangle, the provision of a substantial width (e.g. 10 to 35 mm, preferably 20 to 25) at the tips of the elements allows the elements to cover fully the whole width of the rotor, to ensure pick up of crop, and minimises the effects of wear in the tip region. Thus the shape of the elements allows good crop pick up while maintaining windage and dust effect.

In accordance with another feature of the invention the crop engaging elements may be mounted on helical mounting bars. In addition to evening out the drive line torque, such an arrangement can accentuate a lateral conveying action, either to one side, or, in the case of a split helical arrangement, to the centre or both sides simultaneously.

A crop engaging rotor such as has been set out finds application in a number of fields, for example as a pick-up rotor for picking up cut crop from the ground, and/or as a crop conditioning rotor for effecting conditioning of crop by surface damage to the crop. Such a rotor may be used in isolation or in co-operation with other rotors of the same type, or in co-operation with other conditioning or conveying rotors, or with stationary guide vanes or other crop engaging devices.

In accordance with another advantage which may be obtained with the inventive concepts disclosed in this specification, there may be provided a particularly effective form of conditioning by having two co-operating rotors incorporating conditioning elements or other crop treatment elements each having a principal plane generally transverse to the general direction of crop flow.

It is particularly to be appreciated that the various crop engaging elements and devices set out in accordance with the various aspects of the present invention, may be usefully incorporated as appropriate in the various overall combinations of crop pick-up and crop conditioning machinery which has been set out hereinbefore and/or which is to be set out by way of example hereinafter. It is to be appreciated that there are also provided in accordance with the present invention various methods of conveying and/or treating crop having the various features set out above with regard to the apparatus according to the invention.

In particular, there may be provided in accordance with one aspect of the invention a method of conveying and/or treating crop, comprising the steps of conveying crop by rotation of a rotor having a plurality of outwardly extending crop engaging elements each crop engaging element having a principal plane which traverses the general direction of crop flow, and each element comprising an outwardly extending fin-like element, and having a length in the outward direction greater than its width transverse to the direction of crop flow, each outwardly extending, fin-like element having side edges which, at the crop engaging region of the element, converge towards each other in the outward direction, producing preferential yielding of the crop engaging elements in a selected preferred direction relative to the general direction of crop flow, the said preferred direction of yielding including at least a component along the direction of principal load on the element due to the crop flow, and returning the elements after yielding to their undeflected dispositions at least predominantly by virtue of the resilience of the yielding arrangement, and releasing crop from the elements predominantly by centrifugal release of the crop from the converging side edges of the elements.

Embodiments of the invention will now be described by way of example with reference to the accompanying drawings in which:

FIG. 2 is a diagrammatic perspective view from the rear of a single crop engaging element secured to a main support member of a crop engaging rotor, and which forms an embodiment of the invention in one aspect;

FIG. 2(a) is a diagrammatic plan view of the element shown in FIG. 2.

Figure 3:
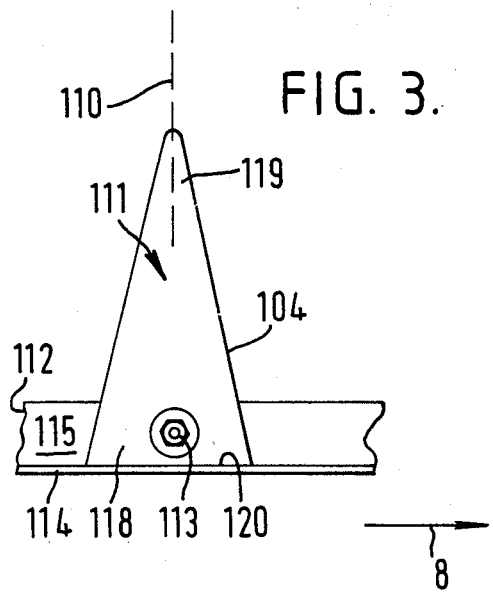
FIGS. 3 and 3(a) are rear and side views respectively of an alternative form of a crop engaging element embodying the invention.
Figure 4:
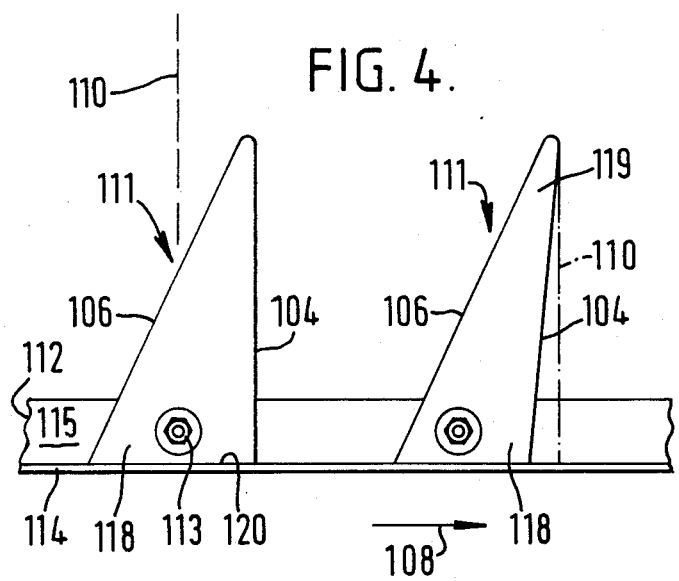
Figure 4A:
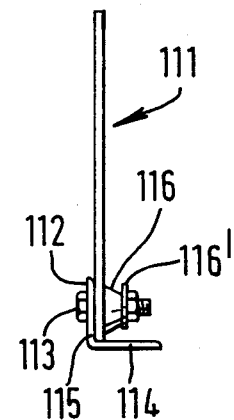
Figure 10:
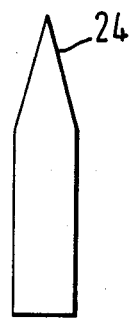
Figure 5:
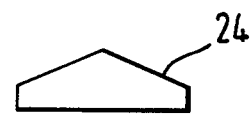

FIGS. 4, and 4(a) are rear and side views respectively of further modified forms of the crop engaging element of FIG. 3;

FIG. 5 is a diagrammatic section through a crop engaging element embodying the invention, taken perpendicular to the length of the element.

Figure 11:
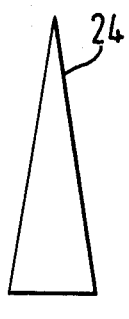
Figure 12:
Figure 13:
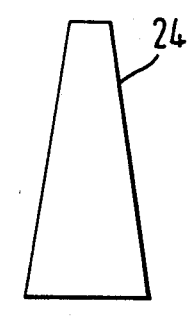
Figure 16:
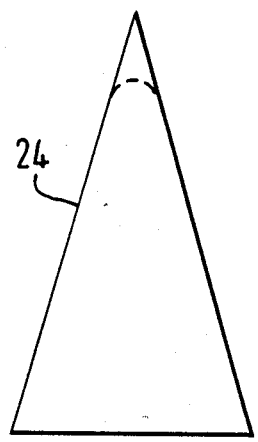
Figure 7A:
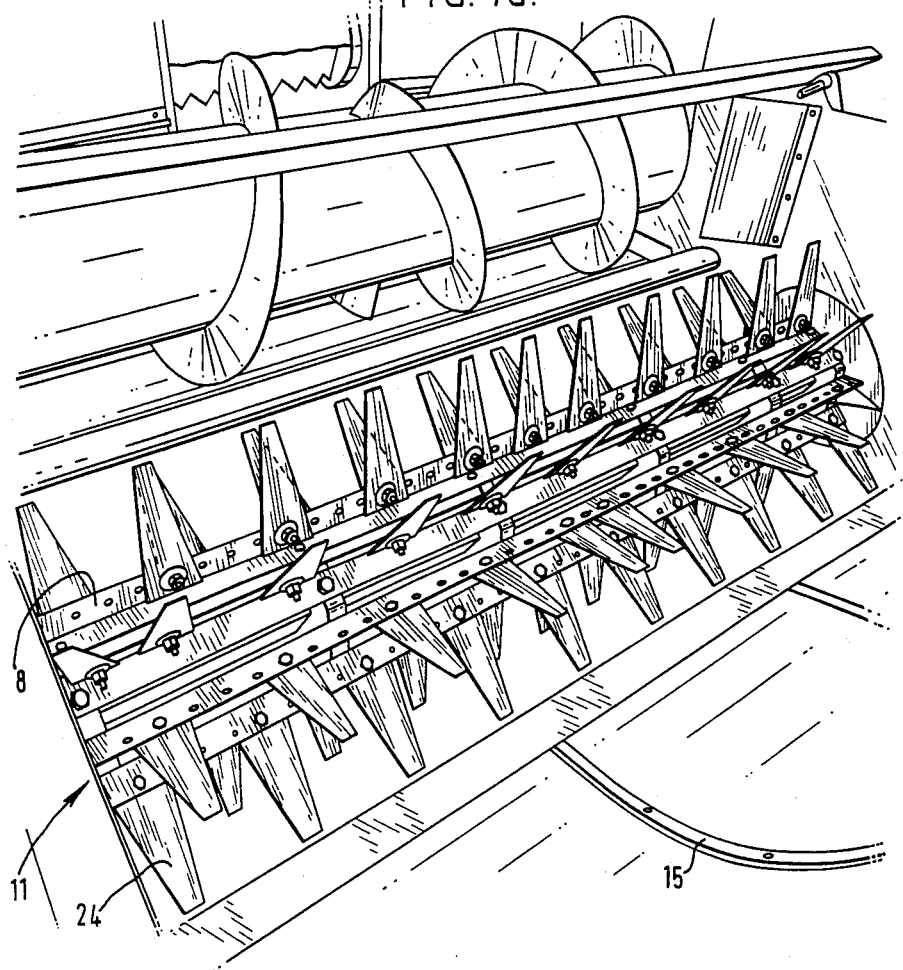
Figure 8:
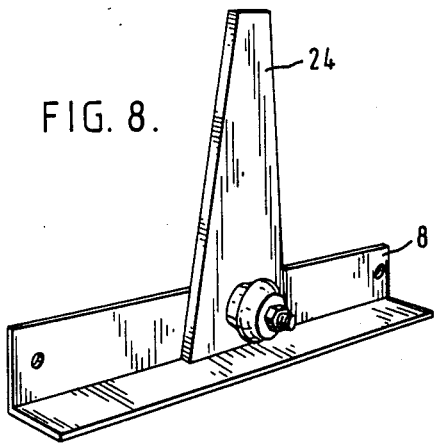
Figure 14:
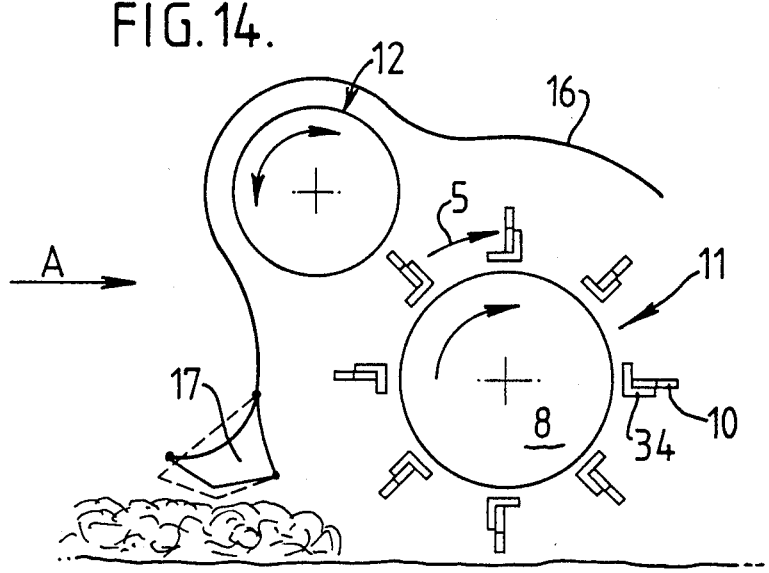
Figure 15:
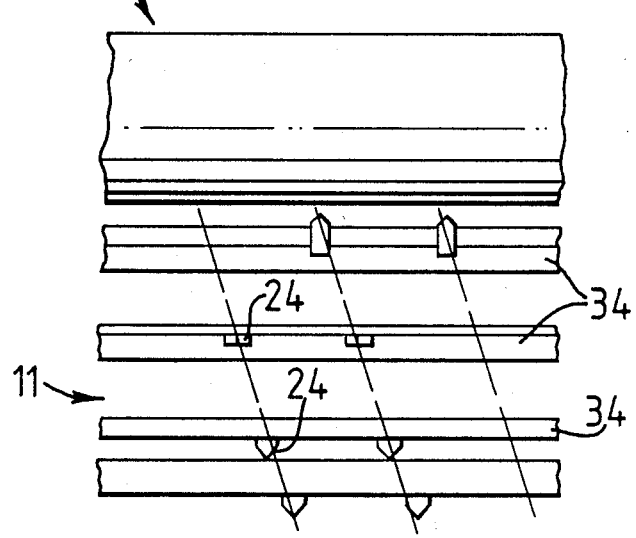
Figure 17C:
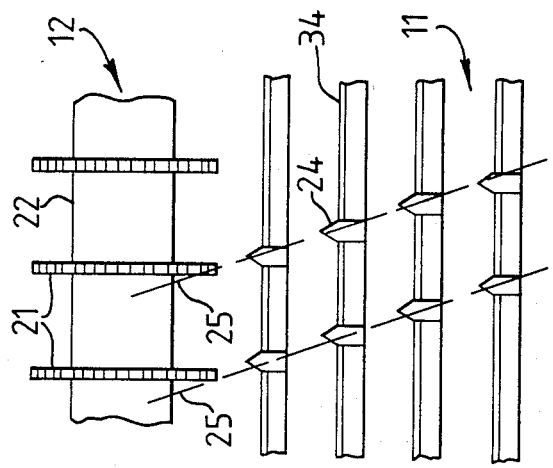
Figure 17A:
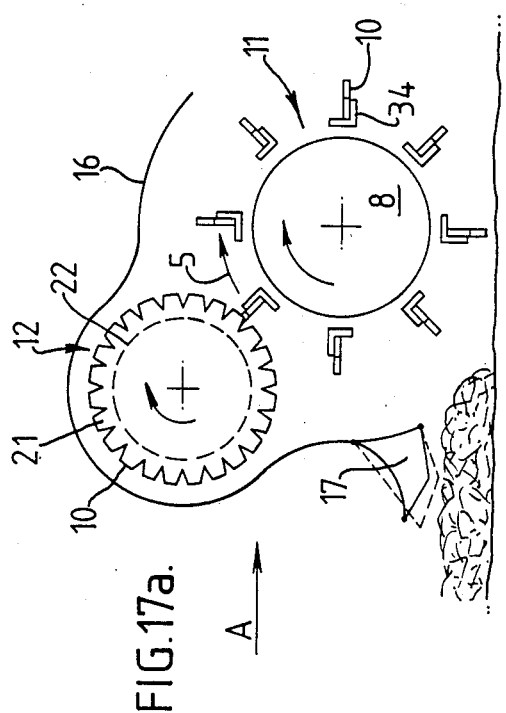
Figure 17B:
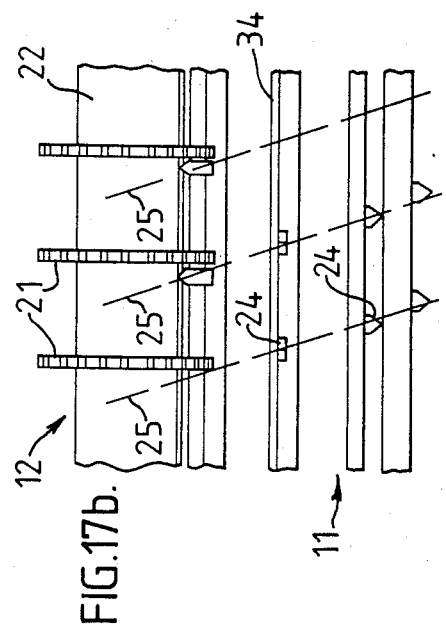
Figure 18B:
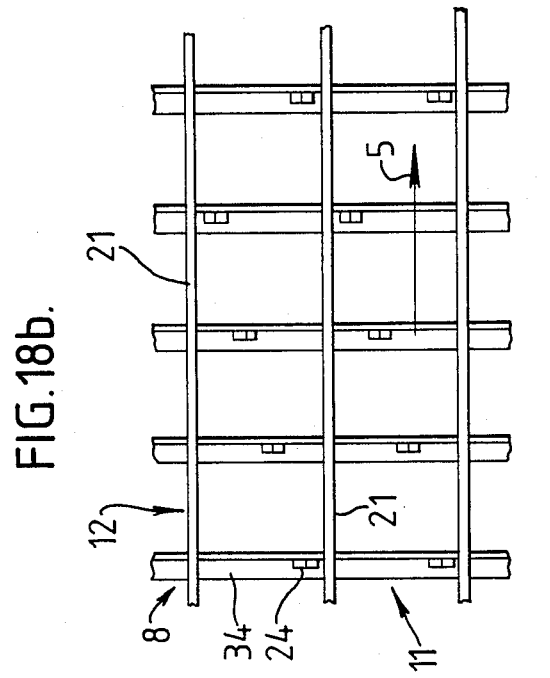
Figure 18A:
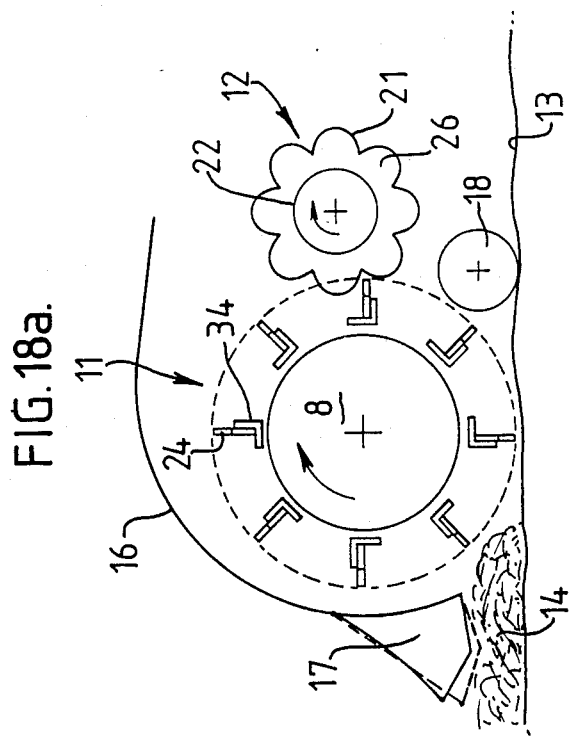
Figure 19:
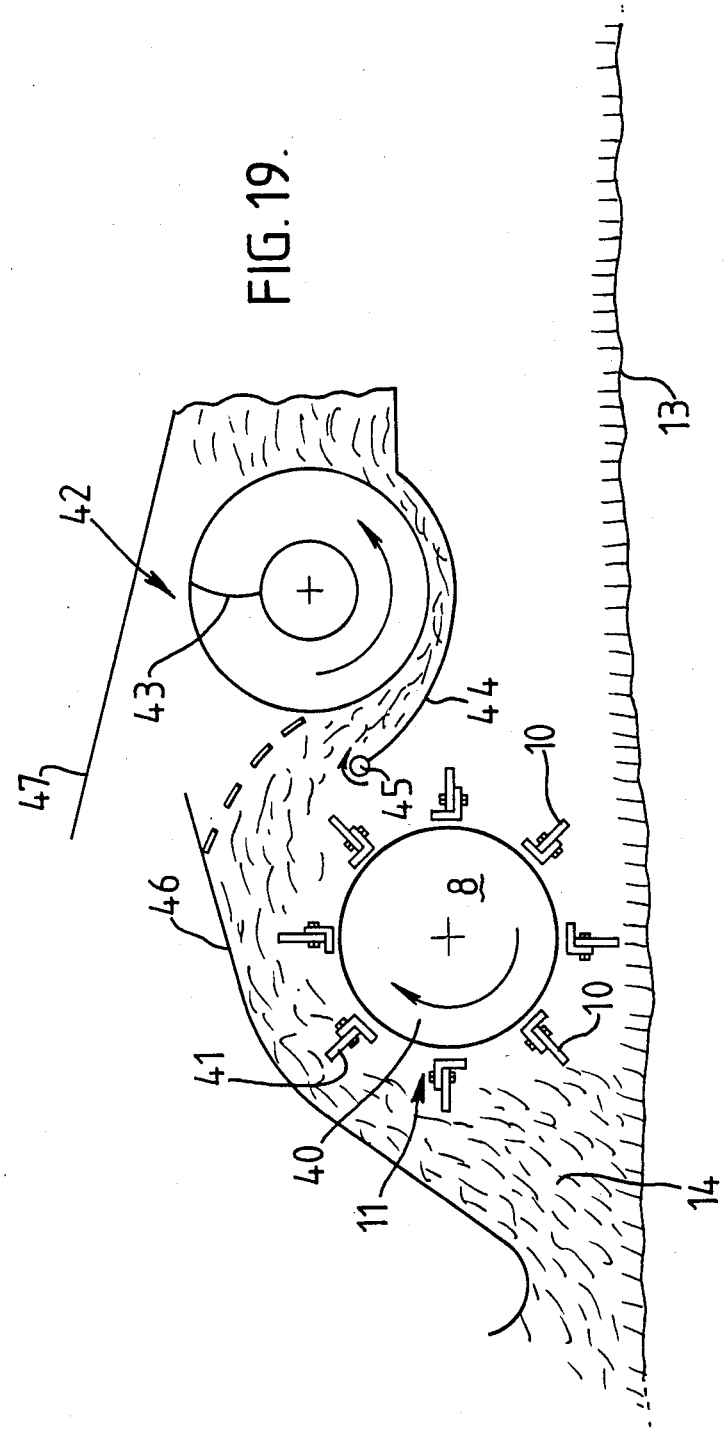
Figure 20A:
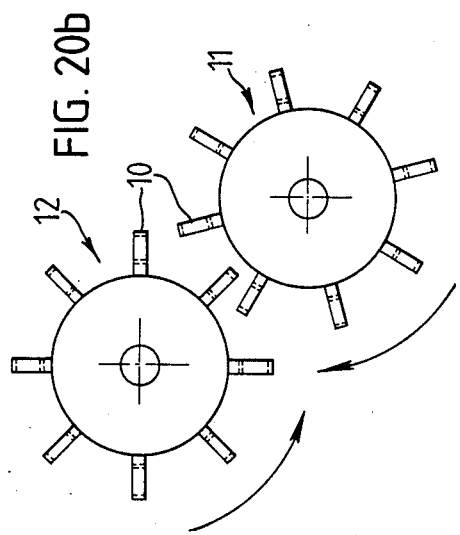
Figure 20B:
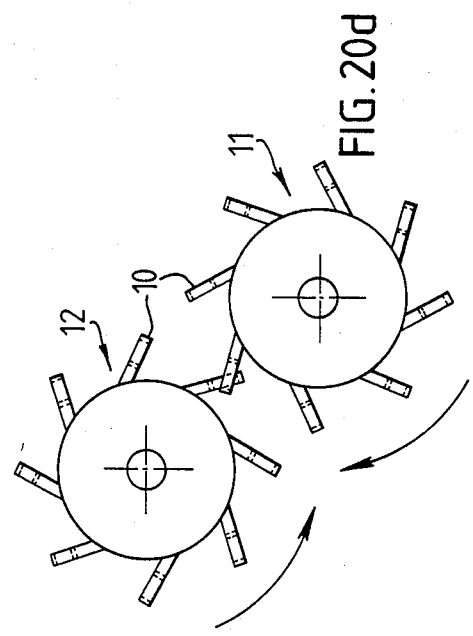
Figure 20C:
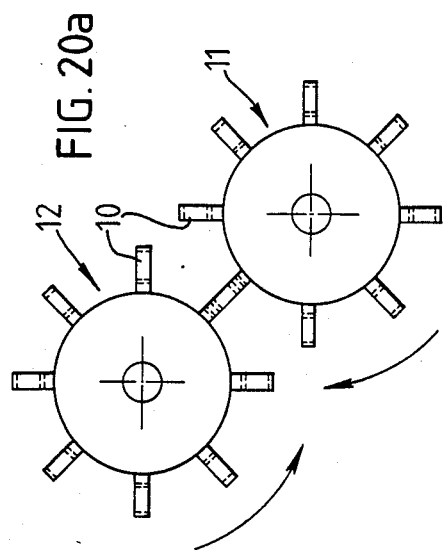
Figure 20D:
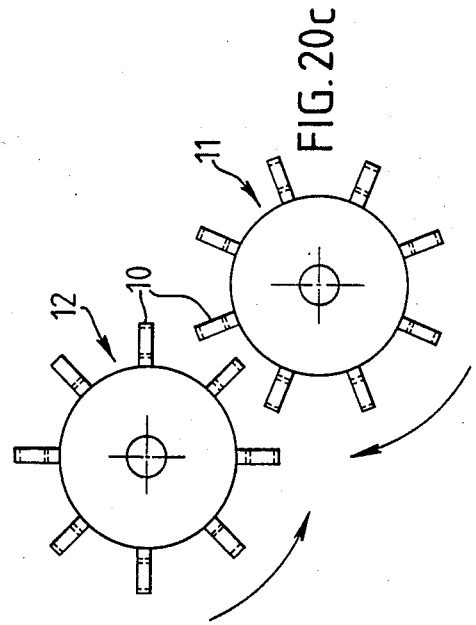
Figure 21A:
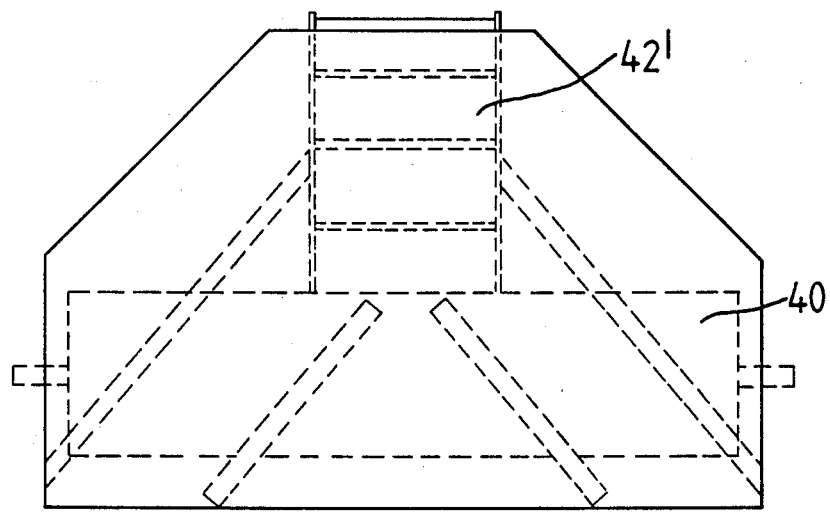
Figure 21B:
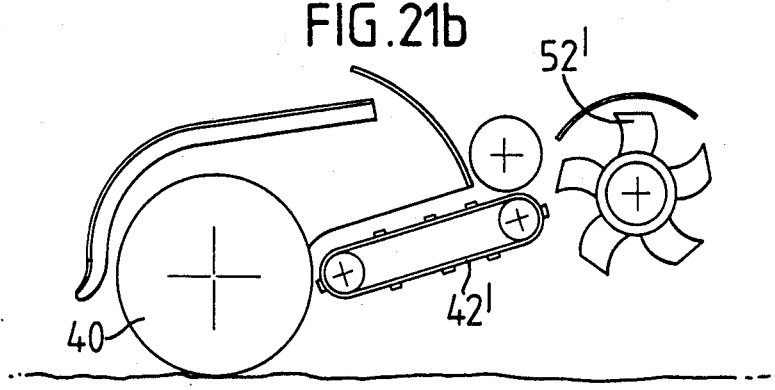

FIGS. 6(a) and 6(b) show in side view two forms of crop engaging element embodying the present invention in which the resilience characteristics of the element are selected by variation in thickness of the element;

FIGS. 7(a) and 7(b) show side perspective and side views respectively of part of a crop engaging rotor embodying the invention having outwardly extending fin-like crop engaging elements;

FIG. 8 is a rear view of one of the crop engaging elements shown in FIGS. 7(a) and 7(b);

FIG. 9 shows in side view a detail of an alternative mounting for crop engaging elements of FIGS. 7(a) and 7(b);

FIGS. 10, 11, 12, 13, 13(a) and 13(b) show diagrammatic rear views of various different basic shapes which may be used for crop engaging elements embodying the invention;

FIGS. 14 and 15 show side and end views of a crop pick-up and conditioning apparatus consisting of a modified form of the apparatus of FIG. 11;

FIG. 16 is a diagrammatic rear view of a crop engaging element embodying the invention, showing how wear may occur;

FIG. 17(a) is a diagrammatic side view of an alternate form of the crop pick-up and conditioning apparatus of FIG. 11;

FIG. 17(b) is a diagrammatic view of part of the rotors of the apparatus of FIG. 17(a), taken in the direction A in FIG. 17(a), with the cover of the machine omitted;

FIG. 17(c) is a diagrammatic view of part of the upper rotor of FIG. 17(a) and of a development of part of the envelope of the lower rotor of FIG. 17(a);

FIG. 18(a) shows a diagrammatic side view of a further modification of the crop pick-up and conditioning apparatus of FIG. 17(a);

FIG. 18(b) is a diagrammatic representation of a development of the rotors of FIG. 18(a), showing an example of the inter-relationship of crop engaging elements on the two rotors;

FIG. 19 is a diagrammatic side view of a crop pick-up apparatus embodying the invention, and illustrating a use of the crop engaging rotor shown in preceding figures;

FIGS. 20(a) to 20(d) show diagrammatic representations of different modes of interation of twin rotor conditioning units; and FIGS. 21(a) and 21(b) show diagrammatic plan and side views of an arrangement of a crop gathering pick-up rotor.

Figure 1A:
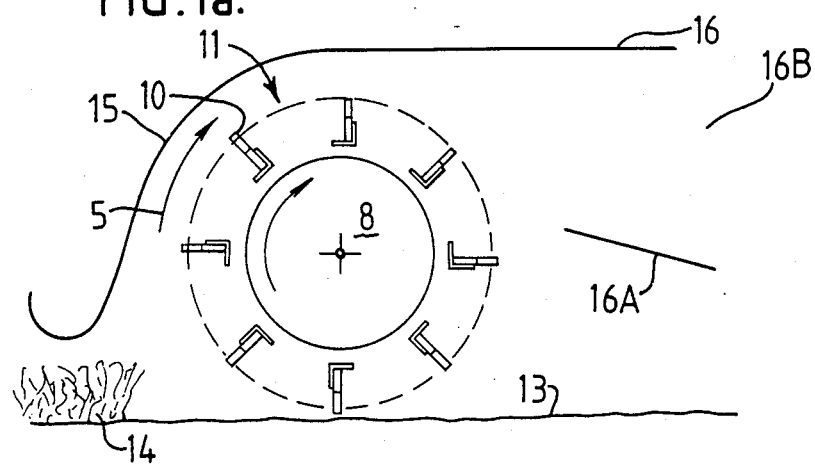
FIG. 1(a) shows in diagrammatic side view apparatus for picking up cut crop from the ground, which may incorporate aspects of the invention.
Figure 1B:
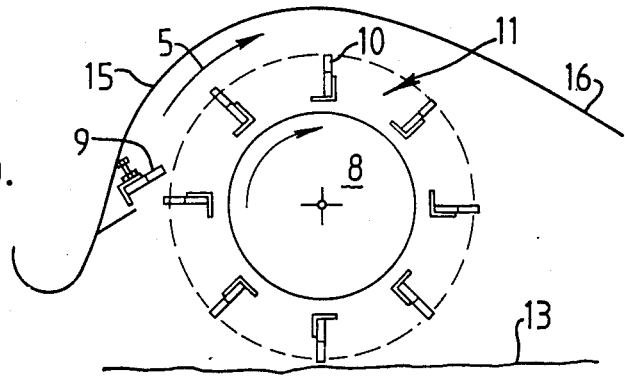
FIG. 1(b) shows in diagrammatic side view apparatus for conditioning crop by a single pick-up and conditioning rotor, which may incorporate aspects of the invention.

FIGS. 1, 1(a), and 1(b) show diagrammatically three basic layouts of crop engaging apparatus which may embody various aspects of the present invention.

In FIG. 1(a) there is shown a crop pick-up apparatus comprising a rotor 11 mounted on a mobile main frame (not shown) for movement over the ground 13 to pick-up previously cut crop shown at 14. A hood 15 extends around the rotor 11 and rearwardly at 16 above a guide plate 16A to form a crop channel 16B leading to a receptacle or to further crop processing machinery such as the chopping mechanism of a forage harvester. The rotor 11 picks up cut crop and passes the crop upwardly over the rotor and rearwardly between the hood extension and the guide plate 16A along the crop channel 16B.

The rotor 11 has a plurality of stiff resilient outwardly directed crop engaging elements indicated generally at 10, which may incorporate any of the features to be described in accordance with the invention hereinafter, or which have been described hereinbefore. The elements 10 are mounted on support means, referred to generally as a support 8, which may for example comprise a number of transverse angle section bars mounted on spaced apart discs to form a squirrel-cage type of rotor base. However other forms of rotor support means may be used as will be described hereinafter.

FIG. 1(b) shows diagrammatically a crop pick-up and conditioning apparatus which has generally the same construction as the apparatus of FIG. 1(a) except that the elements 10 are arranged to perform a crop conditioning function in addition to a crop pick-up function, and there is provided an optional additional stationary crop engaging device 9 under the hood 15 for co-operating with the rotor 11 to effect conditioning. The crop engaging device 9 may be of the same general form as the crop engaging elements 10 on the rotor, or may be any one of a number of other forms to be described hereinafter. The conditioned crop is returned to the ground at the rear and is guided downwardly by the hood extension 16, which in this arrangement is inclined downwardly.

Figure 1C:
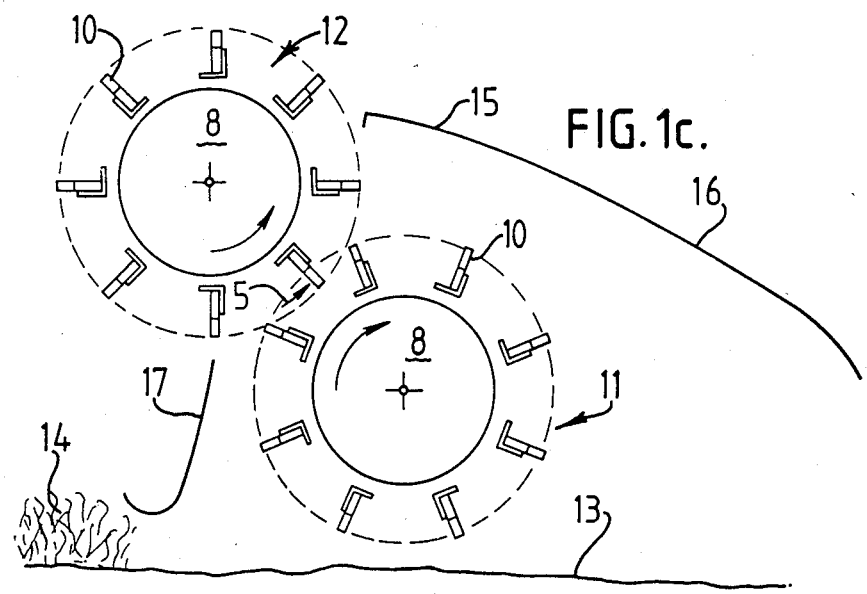
FIG. 1(c) shows in diagrammatic side view apparatus for conditioning crop by co-operation of two conditioning rotors, which may incorporate aspects of the present invention.

In FIG. 1(c) there is shown a crop pick-up and conditioning apparatus having a number of components in common with the arrangement of FIG. 1(a), but including a second rotor 12 which is mounted to rotate in co-operation with the first rotor 11. In the example shown the second rotor 12 rotates in counter-rotation to the rotor 11 to effect crop conditioning in the overlap region between the two rotors, in addition to the conditioning which takes place due to slip during acceleration of the crop 14 on first contact with rotor 11. In other examples to be described hereinafter, the rotors may rotate in the same sense, or in the opposite sense with different speeds of rotation.

The elements of one or each rotor may comprise elements in accordance with aspects of the present invention, or one of the rotors may comprise a brush conditioning rotor of the kind described in our co-pending UK Patent Application No. 8012426, Publication No. 2041713A.

It is to be appreciated that many variations of the arrangements shown in FIGS. 1(a), 1(b) and 1(c) are available, for example there may be provided additional crop slowing, or accelerating, devices, and the co-operating rotors of FIG. 1(c) may be of different sizes and may be rotated clear of each other at different speeds, and in the same or different senses. Many such variations will be described hereinafter; FIGS. 1(a), 1(b) and 1(c) are provided as a general introduction to the types of configuration which may be used.

Next there will be described a series of forms of crop engaging elements suitable for use in the apparatus shown in FIGS. 1(a), 1(b) and 1(c), and in other arrangements. Preferably the elements to be described are formed of stiff flat resilient synthetic plastics material (for example sheeting material), and have the form of a relatively narrow outwardly directed fin-like element. In general, in the following description crop engaging elements are indicated by the general reference numeral 10 where the element can comprise a fin-like element or some other form of crop engaging element. Where the element is particularly a fin-like element, a general reference numeral 24 is used. In other arrangements to be described hereinafter, rib-like elements are indicated by a general reference numeral 23, disc-like crop engaging elements are indicated generally by the reference numeral 21, and brush filaments forming tufts of brushes and constituting crop engaging elements are indicated generally by reference numeral 19. These latter elements do not embody the present invention in themselves, but may form part of embodiments of the invention in some aspects. The crop engaging elements may be arranged for crop conditioning or other crop treatment such as threshing, crop pick-up or crop conveying, or any combination of these functions.

In FIGS. 2 and 2(a) a crop engaging element 24 comprises a planar fin 30 cut from synthetic plastics material and having an outer pointed end 31. The fin 30 is secured in a flexible tubular sleeve 32 by a bolt 33, and the sleeve 32 is in turn secured to a transverse angle bar 34 by a bolt 35. The bar 34 forms part of a squirrel cage rotor composed of a series of axially extending bars 34 which form a support 8 for the element 24.

In operation the rotor formed by the bars 34 will normally be rotated in a sense such that the bar 34 in FIG. 2 moves downwardly into the page. In such a case an upstanding flange 34A of the bar 34 leads the sleeve 32 and protects the securement point of the sleeve. The movement of the bar 34 is indicated diagrammatically at arrows X in FIG. 2(a). If the bars 34 form part of a conveying rotor, such as the rotor 11 in FIG. 1(a), the general, overall, direction of crop flow will be the same as the direction of movement of the bar 34, and the general direction of crop flow in such a case is shown at 5 in FIG. 2(a). It is to be noted particularly that the crop may also have superimposed on this general direction of movement a lateral movement by interaction with the angled fin 30. A direction of crop reaction to contact with the angled fin 30 is indicated generally at 5' in FIG. 2(a), the angle 1' between the general direction of crop flow 5 and the direction of crop reaction 5' being dependent on the shape and width of the element, in addition to dependence on crop factors and rotor speed. Where the term general direction of crop flow is used, what is meant it the overall main direction of movement of crop. This overall main movement of the crop may either be effected by the crop engaging elements (acting as crop conveying elements) or may be effected by other means and may be a crop movement past the crop engaging means (for example where the crop engaging elements are stationary).

The case to be described with reference to FIG. 2(a) is the simple case where the element 10 is a crop conveying element which is moving the crop by driven movement of the elements. Both the element 10 and the crop are moving in the same overall direction, with the element 10 moving faster than the crop, so that the principal load on the element 10 is in the direction indicated at Y, i.e. the opposite direction to the crop flow direction 5.

It is particularly to be appreciated that the various angles and directions indicated in FIG. 2(a) are not intended to indicate precise directions but are given to assist understanding of the invention. In practical circumstances the invention is concerned with overall effects on the crop, and general directions in which the elements yield, and convey the crop.

The fin form element 24 may be arranged with the fin 30 parallel to the angle bar 34, that is to say generally perpendicular to the directions of crop flow, and generally parallel to the axis of rotation of the rotor, but it is preferred that the fin 30 is inclined at a skew angle to the axis of the rotor, as shown. Thus in FIG. 2(a), the principal plane of the crop engaging element 24 is indicated diagrammatically at 2, and is inclined at an angle 3 to the general direction 5 of crop flow. The angle 3 is conveniently 45°.

The effect of the sleeve 32 is to provide for yielding of the tip 31 in a preferred direction relative to the direction of crop flow 5. By a preferred direction of yielding is meant that the fin yields more easily in one direction than another. In the case shown in FIGS. 2 and 2(a), the effect of the flattening of the sleeve at the bolts 33 and 35 is that the fin 31 yields most easily in a direction intermediate between the direction 5 of crop flow, and a direction perpendicular to the principal plane 2. The preferred direction of yielding is indicated diagrammatically at 6, and is inclined at an angle 1 to the direction Y of principal load on the element 30 due to crop flow. The angle 1 may be in the range 20° to 25° for the arrangement shown. The region of yielding of the element 24 is indicated at 7 and is formed by the portion of the sleeve 32 between the bolts 33 and 35. The region of yielding is spaced from the crop engaging region 4 of the element 24 and is closer to the support 8 than to the outer tip 31 of the element.

Figure 3A:
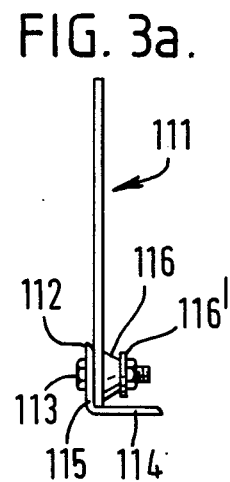

Referring to FIGS. 3 and 3(a), there is shown in rear view part of an array (extending in a direction 108) of crop engaging elements 111 embodying the invention, secured to a transverse mounting bar 112 by bolts 113.

The mounting bar 112 comprises a right angle section bar having an upstanding leading flange 115 and a base flange 114 perpendicular to the flange 115. Where the crop engaging element 111 is formed of resilient material, for example thick stiff resilient plastics material, the element can be bolted directed to the leading flange 115 by a simple nut and bolt arrangement with suitable washers, or (for example where the element 111 is made of rigid material such as steel) the element can be mounted by the bolt 113 passing through a resilient component such as a compression spring, or a rubber cone, which is indicated at 116. The latter arrangement may also be used where the element 111 is resilient. In place of the rubber cone 116 there may be used a bush of polyurathane. Details of such flexible arrangements for the crop engaging elements will be described in more detail hereinafter.

Each crop engaging element 111 comprises a base portion 118 and a crop engaging portion 119. The base portion 118 of the element 111 is secured to the flange 115 by the bolt 113, and terminates in an edge 120 which abuts firmly against the flange 114 of the angle bar 112. Such an arrangement prevents or inhibits rotation of the element 111 about the axis of the fastening means 113. The abutment of the surface 120 against the flange 114 prevents rotation about the bolt 113, but allows rearward movement of the element 111 upon striking an object heavier than crop, by a rearward pivoting action about the edge 120, upon compression of the resilient mounting means 116. This resilient component can be introduced at the leading or trailing end of the mounting bolt 113 as will become apparent from description hereinafter.

FIGS. 4 and 4(a) show rear and side views respectively of an alternative embodiment of the invention comprising part of an array of crop engaging elements 111 and the components which correspond to components shown in FIGS. 3 and 3(a) are referred to by like reference numerals. However the crop engaging elements 111 shown in FIGS. 4 and 4(a) differ from those shown in the previous figures in that the triangular projections extending outwardly from the mounting bar 12 are non-symetrical. Two different kinds of element 111 are shown in FIG. 4. The left element 111 consists of a triangular sheet of material having a base edge 120 abutting the base trailing flange of the mounting bar 112, and having two side edges 106 and 104 inclined to each other to form the outwardly extending projection. The side edge 104 is perpendicular to the flange 114, and the edge 106 constitutes a principal crop engaging edge or region, which is inclined to the axis 100 perpendicular to the transverse direction 108 of the array. A plurality of the elements 111 are provided along the mounting bar 112, each having a principal crop engaging edge or regiion 106 which is inclined in the same sense.

In the modification of the right-hand element 111 in FIG. 4, the side edge 4 is also inclined to the axis 110, and is inclined in the same sense as the principal crop engaging edge or region 106.

Conveniently the elements 11 of FIGS. 3 and 4 can be formed of a sheet of thick stiff resilient material such as synthetic plastics material, and where the material is itself resilient, the element 111 can be bolted directly to the upstanding flange 115 of the mounting bar 112. However in some cases the elements 111 can be formed of non-resilient material such as metal, and in such a case the element is resiliently mounted, for example as shown in FIG. 4(a) by a retaining bolt 113 passing through a rubber bush 116 and metal washer 116', to allow pivoting of the element 11 rearwardly in response to excess load on the element.

Where a right-angled triangle is used as shown in the left element 111, the attachment hole for the bolt 113 is positioned approximately central of the base portion 118, but with an acute triangle as shown on the right-hand side, the bolt 113 is positioned offset from the centre of the case region 118, offset towards the principal crop engaging edge 106.

By way of example of dimensions which may be used in the embodiments shown in FIG. 3, the following are given:

Thickness of sheet material forming elements 111: 4 to 10 mm

Width of crop engaging element 111 in direction 108, at outer tip: 20 mm

Width of crop engaging element 111 at base at edge 120: 75 mm

Length of crop engaging element 111 from edge 120 to outer tip of element 111: 180 mm Depth of each flange 14 or 15 of support bar 112: 40 mm In FIG. 5 there is shown a diagrammatic cross section of one form of crop engaging element, for example generally similar to that shown in rear view in FIG. 3. This shows that one transverse face of the element may have a flat surface and the other may be strengthened by having a central raised spine.

Suitable materials for the crop engaging elements are, for example, polyurethane, nylon, and polypropylene. Depending on the various applications illustrated in the Figures, rotor diameters may vary from approximately 0.3 to 1.0 m diameter, the preferred range being 0.4 to 0.6 m diameter. Tip speeds of the crop engaging elements may vary within the approximate range of 3 to 30 m/s, mainly 10 to 23 m/s. In one example a rotor of diameter 550 mm may be rotated at 700 rev/min.

The crop engaging elements shown in FIGS. 2, 3 and 4 are specifically useful for pick-up and conveying rotors where no specific conditioning effect is required, as well as for use in conditioning rotors where damage to the crop is required. The crop gathering and release characteristics of these elements are such that pick-up rotors in particular can run at relatively low speed and, hence, use less power than brush type rotors.

In FIGS. 6(a) and 6(b) there are shown in diagrammatic side view two alternative forms of crop engaging element 10 which may be used. In both FIGS. 6(a) and 6(b), the element is in the form of an outwardly directed fin 24. Where the cross-section is thicker at the base region as in FIG. 6(a), the tip 4 will bend away smoothly and easily under the influence of a load. This is of particular advantage in a pick-up rotor so that unwanted foreign objects on the field surface are readily passed over instead of being lifted with the crop. When the tip 4 is thicker as in FIG. 6(b), its momentum and transverse rigidity will tend to be maintained under the influence of a load and it will tend to remain straight, any bending taking place mainly at the thinner base region 7. This is of advantage where heavy windrows need to be teased out effectively, yet an adequate response is necessary to heavy entrained objects. The conditioning elements of tapering cross-section in FIGS. 6(a) and 6(b) are fixedly secured to angle bars 34 by bolts 34A, the yielding of the elements 10 being provided by virtue of the resilience of the material of the element.

In FIGS. 7(a) and 7(b) there are shown perspective and side views respectively of a crop engaging rotor indicated generally at 72, and having outwardly directed crop engaging elements 24 each comprising a fin-like element 70 bolted by bolts 73 to an angle bar 71. Each bolt 73 passes through a domed resilient washer 74 formed of synthetic platics material, which allows yielding of the element 70 by a rocking motion against the angle bar 71, the washers 74 being deformed by the rocking motion. In this embodiment, the element 70 is yieldable preferentially in a preferred direction 6 which is aligned generally along the direction of crop flow, indicated at 5.

In the case of the embodiment shown in FIGS. 7(a) and 7(b) the principal plane 2 of each crop engaging element 70 is generally perpendicular to the general direction of crop flow 6, when the element 70 engages the crop at the top centre position indicated at 2A.

In FIG. 7(a), the hood 15 which is normally positioned over the rotor, is shown folded forward in a non-operating position.

In FIG. 8 there is shown a rear view of one of the crop engaging elements 70 shown in FIGS. 7(a) and 7(b).

In FIG. 9 there is shown in side view details of an alternative attachment for the element 70. The element 70 may be fixedly secured or additional resilience is achieved if the hole through the element 70 for the bolt 73 is slightly larger than the diameter of the bolt and a coil spring washer 74 is inserted between the trailing face of the element 70 and a self-locking nut 75, as shown in FIG. 9. The extent of tightening of the nut 75 determines the resistance of the element to deflection.

In FIGS. 10, 11, 12 and 13, 13(a) and 13(b) there are shown diagrammatically a number of basic shapes which may be adopted for crop engaging elements embodying the invention.

Figures 13A, 13B:
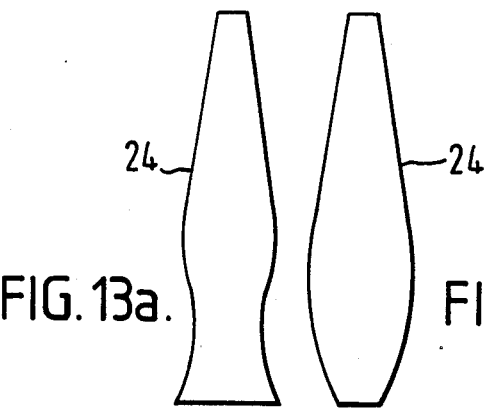

The example shown in FIG. 13(a) has a base region which positively prevents lateral tilting and concentrates any yielding movement adjacent to the mounting region. In the example shown in FIG. 13(b) the outer edges converge towards the base region, so that yielding will take place around the attachment area. If necessary, lateral pivoting about the mounting bolt can be prevented by creating a slot in the mounting bar in which the lower edge of the element can be located. Both elements have rounded shoulders, to minimise the risk of crop adherence, and optionally their tips may be angled, as shown in broken outline, to minimise stubble friction and the risk of foreign objects being lifted, when the elements are used for collecting crop from the ground. Suitable dimensions are: in FIG. 13(a), length of element 180 to 200 mm; width of base 60 mm; width of tip 15 mm; and in FIG. 13(b), length of element 180 to 200 mm; width of base, 30 mm; width of tip 15 mm; width at widest part, 45 to 60 mm.

There will now be described a series of applications of the conditioning elements shown in the preceding figures, and of other crop conveying and conditioning arrangements embodying the invention.

Referring firstly to FIG. 14 there is shown a crop pick-up and conditioning apparatus comprising a first rotor 11 and second rotor 12, both mounted on a mobile main frame (not shown) for movement over the ground 13 to pick-up and condition previously cut crop shown at 14. A hood 15 extends around the second rotor 12, and rearwardly at 16 over the first rotor 11. A forwardly projecting portion 17 of the hood 15 is adjustable or self-adjusting at the lower end as shown so as to be positioned in close proximity to the cut crop 14. An optional, height adjustable ground roller 18 is positioned immediately behind the first rotor 11.

The feeding rotor 12 comprises a plain cylindrical rotor, for example, of steel or plastics material, which holds the crop against the conditioning rotor 11, and also slows the crop flow. The rotor 12 may be freely rotating or braked or driven at a different speed and/or in a different direction from the conditioning rotor 11. Essentially such a feed rotor 12 is a non-clogging rotary device for holding the crop in contract with the spike tips of the conditioning rotor 12 and for retarding the crop flow. FIG. 15 shows a diagrammatic view along the arrow A in FIG. 14.

FIG. 16 shows diagrammatically one form of crop engaging element of the kind shown in FIG. 11. In FIG. 16 there is shown how the sharp tip of the converging sides of the element may be worn away in use to a curved end. In some embodiments, the element may be formed with such a rounded end during manufacture. However, in the arrangement of FIGS. 14 and 15, the elements 10 are formed with sharp tips for conditioning purposes.

FIGS. 17(a), 17(b) and 17(c) show a major modification of the arrangements shown in the preceding Figures, in that the elongate formations 20 of the rotor elements on one rotor 12 are circumferential formations formed generally in planes transverse to the direction of the axes of the rotors, instead of lateral formations as have been described in the previous Figures. In FIGS. 17(a), (b) and (c) elements corresponding to elements shown in preceding Figures are indicated by like reference numerals. Referring firstly to FIG. 17a, the apparatus comprises a first, conditioning, rotor 11 and a second, feeding, rotor 12, the rotors being positioned in similar relationship to that shown in FIG. 11, with the feeding rotor 12 positioned at a higher level than the conditioning rotor 11 and by way of example forwardly of the conditioning rotor. The feeding rotor 12 comprises a plurality of discs 21 spaced apart along the axis of the rotor and orientated generally perpendicular to the axis of the rotor 12. The outer perimeter of each disc 21 is notched or serrated.

The spaced discs 21 on the rotor 12 are also shown in FIG. 17(b) which is a diagrammatic perspective view along the direction of the arrow A in FIG. 17(a). Conveniently the discs 21 are cut from synthetic plastics sheet material and are secured along a tubular drum-like core 22 of the rotor 12.

As shown in FIG. 17(b), the conditioning rotor 11 is formed of a series of right-angle bars 34 extending parallel to the axis of the rotor 11 and spaced angularly round the rotor. Each angle bar 24 carries a number of conditioning elements 24 each of which consists of a short elongate outwardly directed conditioning element generally in the shape of a fin and having a pointed outer end. Each conditioning element 24 can conveniently be cut from synthetic plastics sheet material or can be moulded, and is arranged with the width of the elongate fin generally transverse to the direction of crop flow. A main modification of the embodiment of FIGS. 17(a) and 17(b) over that of FIG. 11 is that the conditioning elements 24 on the rotor 11 are arranged in a formation of spaced apart circumferential rows indicated diagrammatically by broken lines 25. It will be seen that in the embodiment of FIG. 17(b), the spaced apart rows 25 form part of a helix of conditioning elements 24 which winds around the conditioning rotor 11, with appropriate lateral gaps for the discs 21 to register. However in other embodiments the conditioning elements 24 may be arranged in discrete spaced apart rows each of which follows the path of a circle around the axis of the rotor 11 so that the plane of the row of conditioning elements 24 is generally perpendicular to the axis of the rotor 11. In FIG. 17(c) there is shown a diagrammatic development of the envelope of the rotor 11 showing how the conditioning devices 24 intrude into the spaces between the discs 21 on the rotor 12 at progressively displaced positions between adjacent discs.

It is to be understood that the feed rotor 12 can be placed into other positions relative to pick-up rotor 11. For example it may be fitted in the 12 o'clock, or top-dead-centre position, or in the 1, 2 or 3 o'clock positions.

It is a particular feature of the present invention, in its broadest aspect, that the crop engaging rotor 12 shown in FIG. 17(a), may find use in other applications in addition to the twin rotor conditioner shown in that Figure. For example the crop engaging rotor 12 may be used as a pick-up rotor for collecting cut crop lying on the ground, and alternatively, or in addition, may be used as a crop conditioning rotor operating without any further co-operating conditioning rotor. For example the rotor 12 may be positioned in close proximity to the ground for picking up cut crop lying on the ground, and the rotor may be covered by a hood means providing a channel for crop to be carried up and over the rotor 12 and deposited back on the ground for drying. In such circumstances the crop may be conditioned by relative movement between the rotor 12 and the crop during acceleration of the crop when engaged by the rotor. To impede the acceleration and free flow of crop engaged by the rotor, and so increase the conditioning effect, stationary crop engaging elements may be fitted transversely underneath the hood means.

Returning now to consideration of the embodiment shown in FIG. 17(a), the discs 21 are inter-digitated with the conditioning elements 24 along the axis of the rotor, so that the discs 21 press the crop against the conditioning elements 24 by a lateral packing action at intervals across the conditioning rotor, in contrast to the peripheral packing action of the embodiment of FIG. 1. In the embodiment of FIG. 17(a), the feed rotor 12 need not be driven at all, may be fitted with a simple braking device, or can be a driven rotor which is driven faster or slower than the conditioning rotor 11 or in the opposite direction to it. The disc spacing on the feed roller 12 can be narrower to match alternative patterns of elements on the conditioning rotor. Across the width of the rotor, the disc spacing can be varied at different positions, for example the discs 21 can be closer in areas of consistently heavy crop flow. For example, where a rotor is positioned across a series of pairs of counter rotating disc cutters, crop flow will be heavier where counter rotating discs draw the cut crop together, and here the discs 21 may be positioned closer together. Thus the disc spacing on the feed rotor 12 may have direct relationship to the volume of crop flowing in specific areas across the width of the rotor.

In other arrangements, for example as described with reference to FIGS. 14 and 15 to eliminate the lateral intermittency of the discs 21, feed rotor 12 can be constructed in the form of a full-width roller, for example of continuous cylindrical surface, for forcing and holding cut crop against a closely adjacent conditioning rotor.

FIGS. 18(a) and 18(b) show a modification in which a co-rotating secondary stripping rotor 12 interdigitates with pointed-fin shaped crop engaging elements arranged in transverse rows on the conditioning/pick-up rotor 11. The rotor 12 comprises a series of discs 21 spaced apart along the length of the axis of the rotor, and each disc has its periphery shaped with a series of lobes 26.

In FIG. 19 a rotor 11, referred to particularly in this and following embodiments as rotor 40 with individual crop engaging elements 41 as shown lifting a crop and delivering it into an auger feed mechanism 42 as used on forage harvesters and some balers. An advantage of a pick-up rotor of this kind is that the crop engaging elements can be so spaced on their mounting means that all the ground beneath the rotor is swept at least once per rotor rotation, and the high peripheral speed thins out and evens out the crop window. The interface between the rotor 40 and subsequent processing machinery 42 is very important. It is particularly advantageous to guide the crop so that it meets the auger 42 from the front-dead-centre position downwards, and this can be achieved by crop guide bars shown in broken outline at 46a. In front of the auger a funnel is created between the auger flights 43 and the auger trough 44 for the crop to enter readily. The leading edge of the auger trough 44 is formed by a roller 45 which may be driven to avoid crop accumulations. A vertical gap between the rotor cover 46 and auger cover 47 allows the operator to see whether or not the feed mechanism is functioning correctly.

Reference will now be made to FIG. 20, which shows various configurations of rotors and crop engaging elements which find application in many of the embodiments described hereinbefore.

FIGS. 20(a) to 20(d) show diagrammatically a summary of the modes of operation which are possible with counter-rotating twin-rotor crop conditioning systems. In each case two rotors 11 and 12 carry crop engaging elements 10. Conveniently the crop engaging elements may be ribs, or fins, or any other of the crop engaging elements which have been described hereinbefore. For convenience, the case will be described where the crop engaging elements 10 are fin-like elements. In FIG. 20(a) the elements 10 are shown to be perfectly aligned along the axis common to both rotors 11 and 12. The effect on crop trapped between two opposing elements is that it is compressed and consequently bruised. In FIG. 20(b) the two rotors are slightly out of phase. If the elements are parallel sided, then the crop will be sharply bent, stretched and scratched. In FIG. 20(c) the elements on one rotor inter-mesh centrally between rows of elements of the other. Treatment will be more gentle than that described in FIGS. 20(a) and 20(b) above. The essential feature of FIG. 20(d) is that the conditioning elements are reclined at their tips in the direction of rotation, and this may have advantages, particularly vis a vis FIG. 20(a) in respect of the severity of crop treatment and the possibility of foreign objects becoming trapped between opposing elements;

entrapped crop or objects are more likely to cause angular deflection of the elements.

Referring now to FIGS. 21(a) and 21(b) there is shown an arrangement of a crop gathering pick-up rotor generally of the kind which has been described in preceding Figures. In FIGS. 21(a) and 21(b) a pick-up rotor 40 collects crop from the group and passes it to a belt conveyor 42' which takes the place of the auger 42 in the previous arrangements. The belt conveyor 42' then passes the crop to a chopping mechanism 52'. A major advantage of the crop gathering pick-up rotor of FIGS. 21(a) and (b) is that the conventional transverse auger mechanism can be completely omitted, which results in design simplification and consequent cost saving, in that it is a system highly suited to forage harvesters and balers.

I claim:

1. Apparatus for picking up and conveying cut grass or other fibrous fodder crop comprising:

a mobile frame for movement over the ground, a rotor mounted for rotation about an axis substantially parallel to the group for picking up and conveying cut crop, the rotor comprising support means and a plurality of outwardly extending crop engaging elements mounted on the support means for picking up and conveying the crop, drive means for driving the rotor in rotation in a sense such that the rotor picks up cut crop and carries the crop upwardly and rearwardly over the rotor, a housing extending around at least part of the front half of the rotor and forming with the rotor a crop flow passage between the rotor and the housing along which the crop is conveyed by the rotor, said drive means being arranged to drive the rotor in rotation at a speed such that at least at the region where the crop is picked up, the crop engaging elements move faster than the crop being conveyed, and the rotor accelerates the material by lifting it against the resistance provided by the said hood, and means defining a rearwardly directed exit from the rotor for rearward discharge of crop from the rotor, the drive means being arranged to drive the rotor in rotation at a speed sufficient to release crop from the rotor at least predominantly by centrifugal effect, each crop engaging element being formed of stiff material and being arranged to be resiliently yieldable, the yielding arrangement having sufficient stiffness for the elements to be capable of returning after yielding to their undeflected dispositions at least predominantly by virtue of the resilience of the yielding arrangement, each crop engaging element comprising an outwardly extending element having a principal plane which traverses the general direction of crop flow, and having a length in the outward direction greater than its width transverse to the direction of crop flow, each outwardly extending element having side edges which, at the crop engaging region of the elements, converge towards each other in the outward direction to facilitate intrusion into the crop layer and subsequent detachment of the crop under centrifugal effect whilst at the same time preventing material from reaching and wrapping in the core region of the rotor, the crop engaging elements being arranged in a plurality of rows transverse to the general direction of crop flow, the rows being spaced circumferentially around the rotor and there being provided sufficient number of rows for the crop to be engaged by a plurality of rows presented to the crop along the crop flow passage.

2. Apparatus according to claim 1 in which the said housing extends around at least the upper front quadrant of the rotor and extends at the front of the rotor to a level below the front dead center of the rotor, each element having its said principal plane lying substantially in a radial plane containing the axis of rotation of the rotor, each element having a longitudinal axis aligned in the outward direction and each element having its outer end terminated in a surface generally perpendicular to the longitudinal axis of the element, each element being formed from thick, stiff, resilient, and generally flat sheet-like, material, and the drive means being arranged to drive the rotor in rotation with a tip speed of the elements lying within the range of the 3 to 30 meters per second, and the overall diameter of the rotor lying in a range of approximately 0.3 to 1.0 meters.

3. Apparatus according to claim 1 including localised yielding means for providing the said yielding movement of the crop engaging element at least predominantly at a region spaced from the distal crop engaging region of the element.

4. Apparatus to claim 3 in which the support means includes in the region of each element a first flat transverse support member transverse to the general direction of crop flow, and a second flat transverse support member approximately at right angles to the first flat support member, the first transverse support member extending outwardly from the second transverse support member away from the axis of the rotor, the crop engaging element being secured to the first flat support member with a main flat surface of the crop engaging element parallel to and abutting the first flat support member, the crop engaging element having an inner edge surface across the inner end thereof, which abuts the second flat support member for locating the crop engaging element in a required operating position, the crop engaging element being secured to the first flat transverse support member by a coupling member which passes through the crop engaging element at the base region thereof and through the first transverse support member, and which allows movement between the element and the first transverse support member, the said localised yielding means comprising a resilient biassing means which biasses the element towards an outwardly extending operating position, the arrangement allowing yielding of the element by rocking of the element away from the first flat transverse support member against the action of the biassing means, whereby the said yielding movement of the element is provided at least predominantly at the said region spaced from the distal crop engaging region of the element.

5. Apparatus according to claim 3 in which the said localised yielding means is provided by a reduced thickness of each element in the vicinity of the region where the element is secured to the support means, whereby the yielding movement of the element is provided at least predominantly at the said region spaced from the distal crop engaging region of the element.

6. Apparatus according to claim 3 in which the said localised yielding means is provided by a reduced width of each element in the vicinity of the region where the element is secured to the support means, whereby the said yielding movement of the element is provided at least predominantly at the said region spaced from the distal crop engaging region of the element.

7. Apparatus according to claim 1 in which each crop engaging element is formed of stiff resilient material.

8. Apparatus according to claim 1 in which each crop engaging element is arranged to be yieldable preferentially in a selected preferred direction relative to the general direction of crop flow, the said preferred direction of yielding including at least a component along the direction of principal load on the element due to the crop flow.

9. A device according to claim 8 in which the said preferred direction of yielding lies generally along the direction of principal load on the element due to crop flow.

10. A device according to claim 1 in which the said principal plane of each element traverses the general direction of crop flow at an angle of about 90°.

11. A device according to claim 1 in which each element is formed from thick, stiff, resilient, sheet like material.

12. A device according to claim 1 in which each element is formed from plastics or other synthetic material, or natural or synthetic rubber.

13. Apparatus according to claim 1 in which yielding of each element is provided by virtue of resilient biasing means arranged to bias the element towards a required operating position, the element being yieldable by movement away from the operating position against the effect of the biasing means.

14. Apparatus according to claim 1 in which each element has a reduced width, in the vicinity of the region where the element is secured to the support means.

15. Apparatus according to claim 1 in which each crop engaging element has a reduced thickness in the vicinity of the region where the element is secured to the support means.

16. Apparatus according to claim 1 in which each crop engaging element has a thickness which diminishes in the tip region.

17. Apparatus according to claim 1 in which each element is secured to a cooperating, surface of the support means parallel to the principal plane of the element by an elongate coupling member which passes through the crop engaging element.

18. Apparatus according to claim 17 in which said cooperating surface is formed on a support member which extends in operation in front of the crop engaging element, relative to the direction of crop flow, so as to protect the crop engaging element at the region thereof which is secured to the support means.

19. Apparatus according to claim 17 including resilient biasing means acting to bias the element towards the cooperating surface of the support means, the arrangement allowing yielding of the element by a rocking motion away from the said cooperating surface against the effect of the biasing means.

20. A device according to claim 1 in which each crop engaging element is secured to the support means by a coupling member which allows movement between the element and the support means, there being provided resilient biasing means which biasses the element towards an outwardly extending operating position, the arrangement allowing yielding of the element by rocking or pivotting movement of the element relative to the support means against the action of the biasing means.

21. A device according to claim 20 in which the element is a generally flat element and is secured to a cooperating flat surface of the support means by the said coupling member which passes through the element, the said resilient biasing means acting to bias the element towards the flat surface and the element being yieldable by a rocking away from the flat surface against the effect of the biasing means.

22. Apparatus according to claim 1 in which the support means includes in the region of each element a first flat transverse support member perpendicular to the general direction of crop flow, and a second flat transverse support member at right angles to the first flat support member and parallel to the axis of rotation of the rotor, the crop engaging element being secured to the first flat support member with a main flat surface of the support element parallel to and abutting the first flat support member, the crop engaging element having an edge surface across the end thereof attached to the support means which abuts the second flat support member for locating the crop engaging element in a required operating position.

23. Apparatus according to claim 22 in which said first flat support member and second flat support member are constituted by first and second flanges of a right-angle section support bar lying transverse to the crop flow, and forming part of a squirrel-cage structure forming the main structure of the rotor.

24. Apparatus according to claim 1 in which the rotor is mounted with its axis of rotation substantially parallel to the ground and said drive means is arranged to drive the rotor in rotation in a sense sense such that the rotor picks up and conveys crop by lifting the crop upwardly and rearwardly over the rotor.

25. Apparatus according to claim 1 in which the rotor is mounted on the moveable frame in a position such as to pickup previously cut crop lying on the ground.

26. Apparatus according to claim 1 in which the rotor is mounted in the mobile frame in a position such as to pick up cut crop from cutting means for cutting crop during movement of the frame over the ground.

* * * * *

UNITED STATES PATENT AND TRADEMARK OFFICE
CERTIFICATE OF CORRECTION

PATENT NO. : 4,581,880
DATED : April 15, 1986
INVENTOR(S) : Wilfred E. KLINNER

It is certified that error appears in the above-identified patent and that said Letters Patent is hereby corrected as shown below:

On the title page:

The following priority documents should be listed in addition to those already listed:

| | | |
|---|---|---|
| 8114981 | United Kingdom | 5/15/81 |
| 8209019 | United Kingdom | 3/26/82 |

Signed and Sealed this

Third Day of February, 1987

*Attest:*

DONALD J. QUIGG

*Attesting Officer*    *Commissioner of Patents and Trademarks*